2,884,443
PROCESS FOR THE REGENERATION OF TEREPHTHALIC ACID DIMETHYL ESTER FROM POLYETHYLENE TEREPHTHALATE

Erhard Siggel, Laudenbach (Main), and Karl Macura, Klingenberg (Main), Germany, assignors to Vereinigte Glanzstoff-Fabriken A.G., Wuppertal-Elberfeld, Germany No Drawing. Application March 19, 1956
Serial No. 589,355

Claims priority, application Germany March 19, 1955

6 Claims. (Cl. 260—475)

This invention relates to a process for regeneration of terephthalic acid dimethyl ester from polyethylene terephthalate.

A regeneration of terephthalic acid dimethyl ester from polyethylene terephthalate is often desired in order to salvage badly dyed, dirty or otherwise spoiled waste in the form of threads, fibers, ribbons, films, or similar compact masses of the polyester. It has been proposed that such waste be salvaged by treatment with boiling ethylene glycol. However, this treatment results in terephthalic acid diglycol esters which are not only very impure but also, as experience has shown, are very difficult to purify. It has further been proposed that polyethylene terephthalate be decomposed with concentrated acids until terephthalic acid is formed. The disadvantages of this process include the impurity of the resulting terephthalic acid and also the necessity of esterifying the terephthalic acid if it is to be used again for polycondensation. According to another proposal, the regeneration of terephthalic acid dimethyl ester from polyethylene terephthalate can be accomplished by heating the polyester to 220°–245° C. at normal or atmospheric pressure in the presence of superheated methanol vapor and a catalyst such as meta phosphoric acid.

An object of the present invention is to provide a process for the regeneration of terephthalic acid dimethyl ester from polyethylene terephthalate in which the dimethyl ester can be recovered in excellent yields of high purity.

Another object of the invention is to regenerate the terephthalic acid dimethyl ester directly from the polyester, i.e., without the formation of intermediate compounds and also without the formation of substantial amounts of mixed esters.

Other objects and advantages of the invention will become more apparent as the invention is further described hereinafter.

According to the invention, it has now been discovered that the regeneration of terephthalic acid dimethyl ester from polyethylene terephthalate can be accomplished by heating polyethylene terephthalate at an elevated or superatmospheric temperature below 210° C. and under superatmospheric pressure in the presence of methanol, a re-esterification catalyst and an inert, liquid, high-boiling organic media.

A sufficiently high temperature is employed in the process so that the polyester begins to swell or dissolve under the influence of the high-boiling point organic media. Thus, a temperature is generally selected within a range of from 100° C. to 210° C. and preferably from about 130° C. to 160° C. In any event, the temperature should not exceed 210° C.

The process is carried out under superatmospheric pressure, preferably from about 10 to 19 atmospheres.

Any suitable re-esterification catalyst or mixtures thereof can be used in the process. Various catalysts for this purpose are well known in the art. Those catalysts found to be particularly effective in the practice of the invention are zinc, zinc oxide, zinc acetate, lead oxide, lead acetate, magnesium, magnesium oxide and iron. A solid catalyst, usually in a finely divided form, is helpful since it simplifies separation of the catalyst from the reaction mixture.

An important feature of the invention resides in carrying out the reaction in the presence of an inert, liquid, high-boiling organic media. Suitable organic compounds having a high-boiling point will be readily suggested to those skilled in the art. Such compounds should be inert, i.e., should not be reactive with the other substances employed in the process and also should not decompose at the temperature and pressure conditions of the process. The organic compound selected should be present in its liquid phase at the operating conditions employed and therefore would ordinarily have a boiling point above 210° C. Those compounds which have a boiling point range from 210° C. to 300° C. are especially useful for the purposes of the process.

High-boiling point organic compounds which have been found to be particularly useful as an organic media are diphenyl, diphenyl ether, diphenyl methane, α-methylnaphthalene, and β-methylnaphthalene. Other organic compounds having the desired characteristics include decanaphthalene and tetranaphthalene.

Of course, mixtures of compatible organic compounds can be used for the organic media. The organic compounds employed as an inert, liquid, high-boiling organic media are preferably present in a quantity of about one to ten percent by weight of polyethylene terephthalate. A quantity of in the vicinity of five percent by weight of polyethylene terephthalate has been found to be particularly advantageous.

The polyethylene terephthalate employed as a raw material for the process need not be subjected to any special pre-treatment. Thus, the process is highly suitable for salvaging waste materials containing polyethylene terephthalate such as threads, filaments, bristles, fabrics or similar textile products which are poorly dyed, dirty, or otherwise unuseable. Surprisingly, a very pure terephthalic acid dimethyl ester in high yields is obtained by the process of the invention even with a synthetic polyester fiber which is poorly dyed or similarly contaminated.

The regeneration can be carried out in a suitable pressure vessel in which the components are mixed and preferably stirred while heating for a period of time sufficient to permit complete reaction. After cooling, the reaction mixture, the terephthalic acid dimethyl ester is present in the form of a crystalline solid which together with the solid catalysts can be easily separated from the liquid organic media and other liquid products. The terephthalic acid dimethyl ester can then be obtained in a very pure form by recrystallization from methanol, the solid catalyst being separated, e.g., by filtration, from the methanol and dimethyl ester solution.

The importance of the organic compounds employed as an inert, liquid, high-boiling point organic media was determined in a comparative test carried out under the same operating conditions as described in the process of the invention but without the addition of the high-boiling point organic compounds. In the absence of such an organic media, the regeneration of terephthalic acid dimethyl ester from polyethylene terephthalate was incomplete, particularly because of the formation of a mixed ester by the terephthalic acid, methanol, and ethylene glycol. In contrast, when the process is carried out in accordance with the invention in the presence of the described organic media, a much more complete regeneration of the desired dimethyl ester is obtained with yields of 90% or more.

The invention is further illustrated but not limited by the following examples.

Example 1

4000 g. polyethylene terephthalate waste in the form of fibers or threads are placed into a pressure vessel and 4.8 liters methanol and 400 g. $\alpha$-methylnaphthalene and 40 g. zinc dust are added. A pressure of 18 atmospheres is maintained in the pressure vessel and sufficient heat is supplied to raise the temperature to from 130° to 140° for a period of four hours. During this time, the reaction mixture is continuously stirred. After cooling, the terephthalic acid dimethyl ester is initially obtained in the form of a compact, whitish-grey mass of crystals. 1.5 liters of methanol are added to form a slurry in order to obtain better filtration. Glycol and $\alpha$-methylnaphthalene are removed by suction filtration from this initial ester. The dimethyl ester is then recovered in pure form and with a yield of 90% by recrystallization from ethanol, the zinc catalyst being separated by filtration of the methanol-ester solution.

Example 2

4000 g. polyethylene terephthalate waste in the form of compact, badly dyed and contaminated masses are mixed in a pressure vessel with 420 g. diphenyl ether and 30 g. magnesium and 5 liters methanol. A pressure of 16 atmospheres is maintained in the pressure vessel which is heated to a temperature of 135° for four hours. The reaction mass is constantly stirred during that time. After cooling, the terephthalic acid dimethyl ester is initially obtained in the form of a compact, whitish-grey mass of crystals, to which are added 1.5 liters methanol to form a slurry in order to obtain better filtration. After separation of the dimethyl ester by filtration, the ester is obtained in pure form and with a yield of 91% by recrystallization from methanol.

The invention is hereby claimed as follows:

1. A process for regeneration of terephthalic acid dimethyl ester from polyethylene terephthalate comprising heating polyethylene terephthalate at an elevated temperature of 100° to 210° C. and under a superatmospheric pressure of from about 10 to 19 atmospheres in the presence of methanol, a re-esterification catalyst, and an inert, liquid, high-boiling organic media.

2. A process as defined in claim 1 wherein polyethylene terephthalate is heated at a temperature of from about 130° C. to 160° C.

3. A process as defined in claim 1 wherein the re-esterification catalyst present is a member selected from the group consisting of zinc, zinc oxide, zinc acetate, lead oxide, lead acetate, magnesium, magnesium oxide and iron.

4. A process as defined in claim 1 wherein the inert, liquid, high-boiling organic media is present in a quantity of about one to ten percent by weight of polyethylene terephthalate.

5. A process for regeneration of terephthalic acid dimethyl ester from polyethylene terephthalate comprising heating polyethylene terephthalate at an elevated temperature of 100° C. to 210° C. and under a superatmospheric pressure of from about 10 to 19 atmospheres in the presence of methanol, a re-esterification catalyst, and a high-boiling organic compound selected from the group consisting of diphenyl, diphenyl ether, diphenyl methane, $\alpha$-methylnaphthalene, and $\beta$-methylnaphthalene.

6. A process for regeneration of terephthalic acid dimethyl ester from polyethylene terephthalate comprising heating polyethylene terephthalate at a temperature of from about 130° C. to 160° C. and under a superatmospheric pressure of from about 10 to 19 atmospheres in the presence of methanol, a re-esterification catalyst selected from the group consisting of zinc, zinc oxide, zinc acetate, lead oxide, lead acetate, magnesium, magnesium oxide and iron, and a high-boiling organic compound selected from the group consisting of diphenyl, diphenyl ether, diphenyl methane, $\alpha$-methylnaphthalene and $\beta$-methylnaphthalene.

References Cited in the file of this patent

UNITED STATES PATENTS

| | | |
|---|---|---|
| 2,465,319 | Whinfield et al. | Mar. 22, 1949 |
| 2,534,028 | Izard | Dec. 12, 1950 |

FOREIGN PATENTS

| | | |
|---|---|---|
| 934,702 | Germany | Nov. 3, 1955 |
| 1,117,646 | France | Feb. 27, 1956 |

OTHER REFERENCES

Wagner et al.: "Synthetic Organic Chemistry," p. 486, J. Wiley, 1953.